(12) United States Patent
Adachi

(10) Patent No.: US 8,913,309 B2
(45) Date of Patent: Dec. 16, 2014

(54) IMAGE READING APPARATUS AND IMAGE FORMING APPARATUS

(71) Applicant: Canon Kabushiki Kaisha, Tokyo (JP)

(72) Inventor: Seiichiro Adachi, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/904,424

(22) Filed: May 29, 2013

(65) Prior Publication Data

US 2013/0321886 A1 Dec. 5, 2013

(30) Foreign Application Priority Data

May 31, 2012 (JP) ................................. 2012-124455

(51) Int. Cl.
| | |
|---|---|
| *H04N 1/04* | (2006.01) |
| *H04N 1/00* | (2006.01) |
| *H04N 1/203* | (2006.01) |
| *H04N 1/12* | (2006.01) |

(52) U.S. Cl.
CPC ....... *H04N 1/00602* (2013.01); *H04N 1/00628* (2013.01); *H04N 1/2032* (2013.01); *H04N 1/12* (2013.01); *H04N 1/00689* (2013.01); *H04N 1/0062* (2013.01); *H04N 2201/0094* (2013.01); *H04N 1/00694* (2013.01)
USPC .......... 358/498; 358/497; 358/488; 271/3.14; 399/407

(58) Field of Classification Search
CPC ....... H04N 1/00588; H04N 1/12; H04N 1/00; H04N 1/0057; H04N 1/04; H04N 2201/0094; H04N 1/00618; H04N 1/0066; H04N 1/00702; H04N 1/121; H04N 1/00602; H04N 1/00615; H04N 1/0062; H04N 1/00628
USPC ......... 358/498, 1.13, 474, 1.2, 497, 1.12, 1.9, 358/3.28, 448, 496, 509; 271/3.14, 256, 271/264, 121, 225, 254, 270, 9.08; 399/407, 110, 367, 119, 364, 395, 40
See application file for complete search history.

(56) References Cited

U.S. PATENT DOCUMENTS

| | | | | |
|---|---|---|---|---|
| 4,839,740 | A | * | 6/1989 | Yoshida .......................... 358/498 |
| 4,913,416 | A | * | 4/1990 | Murata et al. .................. 271/186 |
| 4,921,236 | A | * | 5/1990 | Saeki et al. .................... 271/3.05 |
| 5,513,017 | A | * | 4/1996 | Knodt et al. .................... 358/471 |
| 5,563,699 | A | * | 10/1996 | Tsukamoto .................... 399/370 |

(Continued)

FOREIGN PATENT DOCUMENTS

JP 2006-052082 A 2/2006

*Primary Examiner* — Negussie Worku

(74) *Attorney, Agent, or Firm* — Fitzpatrick, Cella, Harper & Scinto

(57) ABSTRACT

An image reading apparatus that includes an image reading portion, a tray, a first regulation member movable in a width direction on the tray, a second regulation member movable in association with the first regulation member, a first rotating portion and a second rotating portion that are each capable of being rotated by a sheet on the tray, and a sensor portion configured to generate a signal based on rotations of the first and second rotating portions. The first rotating portion is located between the first regulation member and the second regulation member that regulate both edges of a sheet having a minimum width, and the second rotating portion is located between the other edge of a sheet having a smaller width and the first regulation member, when sheets having different widths are supported on the tray with each having one edge aligned with the first regulation member.

16 Claims, 6 Drawing Sheets

(56) References Cited

U.S. PATENT DOCUMENTS

| | | | |
|---|---|---|---|
| 5,671,466 A * | 9/1997 | Hokamura et al. | 399/124 |
| 5,687,010 A * | 11/1997 | Van Tilborg et al. | 358/496 |
| 5,995,801 A * | 11/1999 | Katsuta et al. | 399/367 |
| 6,075,623 A * | 6/2000 | Yun | 358/486 |
| 6,157,478 A * | 12/2000 | Naiki et al. | 359/204.1 |
| 7,000,915 B2 * | 2/2006 | Makino | 271/3.14 |
| 7,079,283 B2 * | 7/2006 | Otsuka et al. | 358/1.9 |
| 7,139,108 B2 * | 11/2006 | Andersen et al. | 358/474 |
| 7,746,523 B2 * | 6/2010 | Kim | 358/498 |
| 8,104,260 B2 * | 1/2012 | Girgis et al. | 60/204 |
| 8,264,752 B2 * | 9/2012 | Katsuyama | 358/498 |
| 8,400,689 B2 * | 3/2013 | Shiraishi | 358/483 |
| 8,405,888 B2 * | 3/2013 | Fukutome et al. | 358/488 |
| 8,467,112 B2 * | 6/2013 | Takeuchi | 358/498 |
| 8,498,025 B2 * | 7/2013 | Fukasawa | 358/474 |

* cited by examiner

IMAGE READING APPARATUS AND IMAGE FORMING APPARATUS

BACKGROUND OF THE INVENTION

1. Field of the Invention

The present invention relates to an image reading apparatus configured to feed, to an image reading portion, sheets supported on a supporting portion one by one to read an image on each of the sheets.

2. Description of the Related Art

In general, a copying machine including an automatic document conveying apparatus (an automatic document feeder) (hereinafter referred to as "ADF") for automatically reading a plurality of documents (sheets) is widely known. The ADF is configured to separate documents placed on a document tray into each document, convey each document to a reading position, and scan an image of each of the conveyed documents so as to automatically obtain image data of each of the documents.

The above-mentioned ADF which includes a detecting sensor configured to detect the presence/absence of a document on the document tray (document table) has conventionally been devised (see Japanese Patent Application Laid-Open No. 2006-052082). In the ADF described above, in general, documents having the same width are placed on the document tray and are then conveyed to the reading position. However, there is a request to automatically read an image on each of documents of a sheaf of documents having different widths placed in a mixed manner by using the ADF.

In general, the sheaf of documents is placed on the document tray, and the position of the documents is regulated by regulation plates in the ADF. When the documents having different widths are placed in a mixed manner on the document tray, however, the positions of the regulation plates are adjusted to the document having the largest size. Therefore, for the documents having smaller sizes, only one edge is regulated by the regulation plates. In this case, when a difference between the widths of the documents placed in a mixed manner is large, there are some cases where only the documents having a predetermined size or larger can be detected.

SUMMARY OF THE INVENTION

In view of the problem described above, the present invention provides an image reading apparatus and an image forming apparatus, which can detect documents even when a difference between widths of the documents having different widths supported in a mixed manner on a supporting portion is large.

According to an exemplary embodiment of the present invention, there is provided an image reading apparatus, including: an image reading portion configured to read an image formed on a sheet; a supporting portion on which a plurality of sheets of which images are to be read by the image reading portion are to be supported; a separation and feed portion configured to separate the plurality of the sheets supported on the supporting portion into each sheet and feed the sheet to a sheet conveying path configured to guide the sheet to the image reading portion; a first regulation member provided so as to be movable in a width direction orthogonal to a feed direction of the sheet supported on the supporting portion; a second regulation member provided so as to be opposed to the first regulation member in the width direction, and configured to move in association with the first regulation member to regulate an edge of the sheet supported on the supporting portion in the width direction together with the first regulation member so that a midpoint between the first regulation member and the second regulation member in the width direction is aligned with a center of the sheet conveying path; a first rotating portion to be rotated by being pushed by the sheet supported on the supporting portion; a second rotating portion to be rotated by being pushed by the sheet supported on the supporting portion; and a sensor portion configured to generate a signal in accordance with rotations of the first rotating portion and the second rotating portion, wherein the first rotating portion is provided so that a position of the first rotating portion in the width direction is located between the first regulation member and the second regulation member when both edges of a sheet having a feedable minimum width are regulated on the supporting portion, and the second rotating portion is provided so that, when sheets having different widths are supported on the supporting portion with each one edge being aligned with the first regulation member and an other edge of a sheet having a smaller width of the sheets supported on the supporting portion is located on a side of the first regulation member with respect to the first rotating portion, a position of the second rotating portion in the width direction is located between the other edge of the sheet having the smaller width supported on the supporting portion and the first regulation member.

Further features of the present invention will become apparent from the following description of exemplary embodiments with reference to the attached drawings.

DESCRIPTION OF THE EMBODIMENTS

Figure 1:
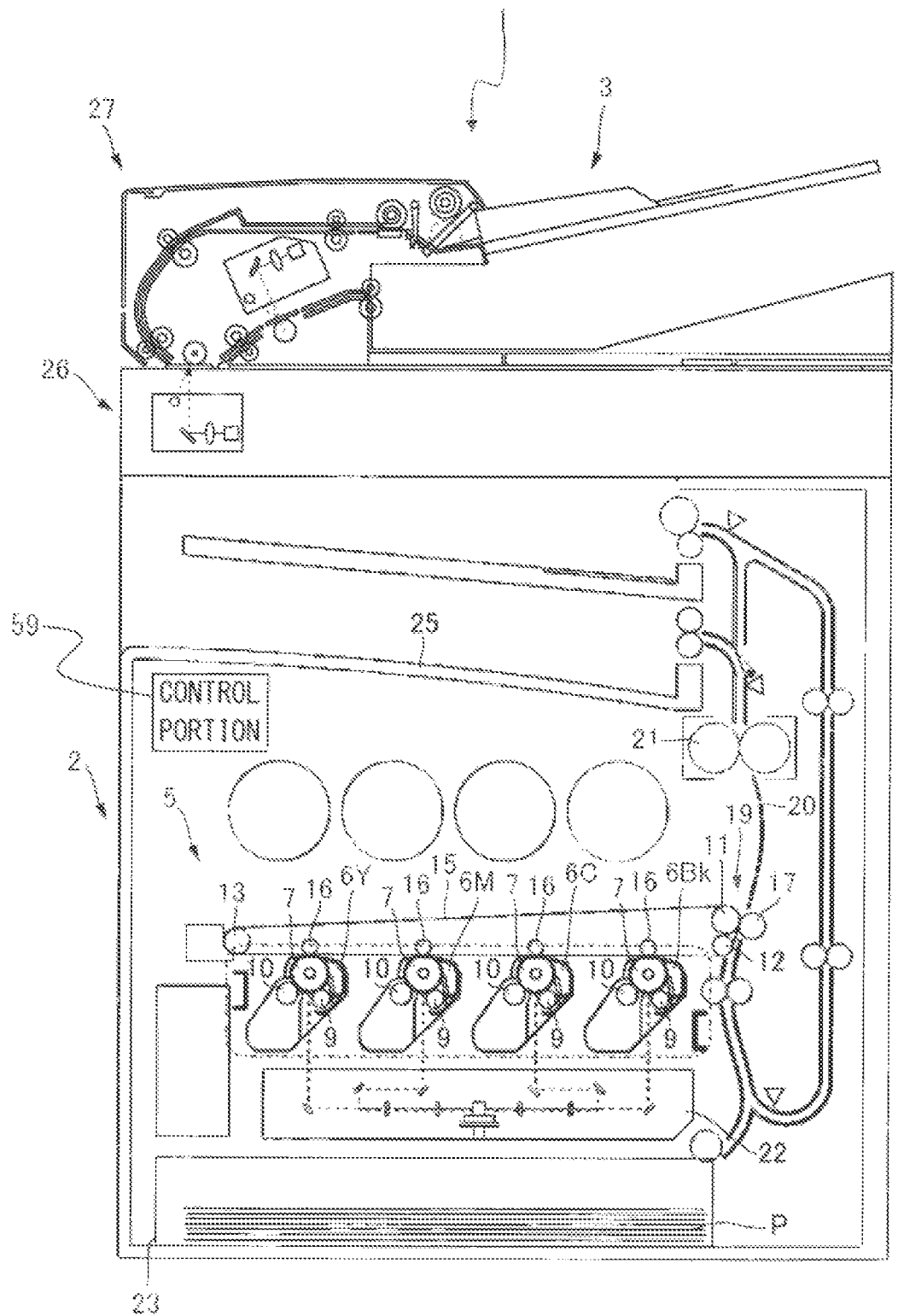
FIG. 1 is a side sectional view illustrating a structure of an image forming apparatus including an image reading apparatus according to an embodiment of the present invention.

In the following, an image reading apparatus according to an embodiment of the present invention will be described referring to FIGS. 1 to 8. FIG. 1 illustrates a digital color multifunctional peripheral (hereinafter referred to simply as "copying machine") 1 which is an example of an image forming apparatus including an image reading apparatus 3 according to the embodiment. The copying machine 1 includes a copying machine main body portion 2 and the image reading apparatus 3. The copying machine main body portion 2 includes an image forming portion 5 configured to form an image, which is installed therein. The image reading apparatus 3 configured to read an image is provided above the copying machine main body portion 2.

Four process cartridges 6Y, 6M, 6C, and 6Bk, each configured to form a toner image, are removably mounted in the image forming portion 5. Specifically, the process cartridge 6Y contains a yellow (Y) toner. Similarly, the process cartridge 6M contains a magenta (M) toner, the process cartridge 6C contains a cyan (C) toner, and the process cartridge 6Bk contains a black (Bk) toner. A photosensitive drum 7, a charging roller 9, and a developing device 10 are provided in each of the process cartridges 6Y, 6M, 6C, and 6Bk. An endless intermediate transfer belt 15 is provided above the process cartridges 6Y, 6M, 6C, and 6Bk. The intermediate transfer belt 15 is looped around a secondary transfer opposed roller 11, a driving roller 12, and a driven roller 13. The intermediate transfer belt 15 is sandwiched between primary transfer rollers 16 and the photosensitive drums 7. The primary transfer rollers 16 are provided so as to be opposed to the photosensitive drums 7 of the process cartridges 6Y, 6M, 6C, and 6Bk described above.

A secondary transfer roller 17 is provided so as to be opposed to the secondary transfer opposed roller 11. The secondary transfer opposed roller 11 and the secondary transfer roller 17 constitute a secondary transfer portion 19. The secondary transfer portion 19 is provided on a conveying path 20 configured to convey sheets P. On a part of the conveying path 20, which is located on a downstream side of the secondary transfer portion 19 in a sheet conveying direction, a fixing device 21 configured to fix an image is provided.

An exposure device 22 and a sheet feed cassette 23 are provided below the process cartridges 6Y, 6M, 6C, and 6Bk. The exposure device 22 emits laser beams. The sheet feed cassette 23 is provided so that the sheet feed cassette 23 can be pulled out in a direction orthogonal to a sheet feed direction.

Next, an image forming operation of the copying machine 1 configured as described above will be described. Image data read by the image reading apparatus 3 is converted into an electric signal which is then transmitted to the exposure device 22. The exposure device 22 irradiates surfaces of the photosensitive drums 7 with the laser beam according to the electric signal. The surfaces of the photosensitive drums 7 are sequentially exposed by the radiation of the laser beam.

The developing devices 10 make the negatively charged toners to adhere onto the photosensitive drums 7 to develop an electrostatic latent image. The electrostatic latent image is visualized by being developed by the toners of the respective colors, that is, yellow, magenta, cyan, and black. At the same time, a bias having the opposite polarity to the polarity of the charged toners is applied to the primary transfer rollers 16. As a result, toner images on the photosensitive drums 7 are sequentially transferred onto the intermediate transfer belt 15 in a superimposed manner.

A sheet P fed from the sheet feed cassette 23 is conveyed to the secondary transfer portion 19 in synchronization with the toner images on the intermediate transfer belt 15. A bias having the opposite polarity to the polarity of the charged toners is applied to the secondary transfer roller 17, and hence the toner images are collectively transferred onto the sheet P. Then, after a color image is fixed by the fixing device 21 onto the sheet P having the tonner images transferred thereon, the sheet P is delivered to a delivery tray 25.

Next, the image reading apparatus 3 provided above the copying machine main body portion 2 will be described. The image reading apparatus 3 includes, as illustrated in FIG. 1, an image reading apparatus main body (hereinafter referred to simply as "apparatus main body") and an automatic document feeder (ADF) 27. The apparatus main body 26 reads image information of an image to be formed by the image forming portion 5. The ADF 27 conveys (feeds) the sheet P to the apparatus main body 26.

Figures 2, 3:
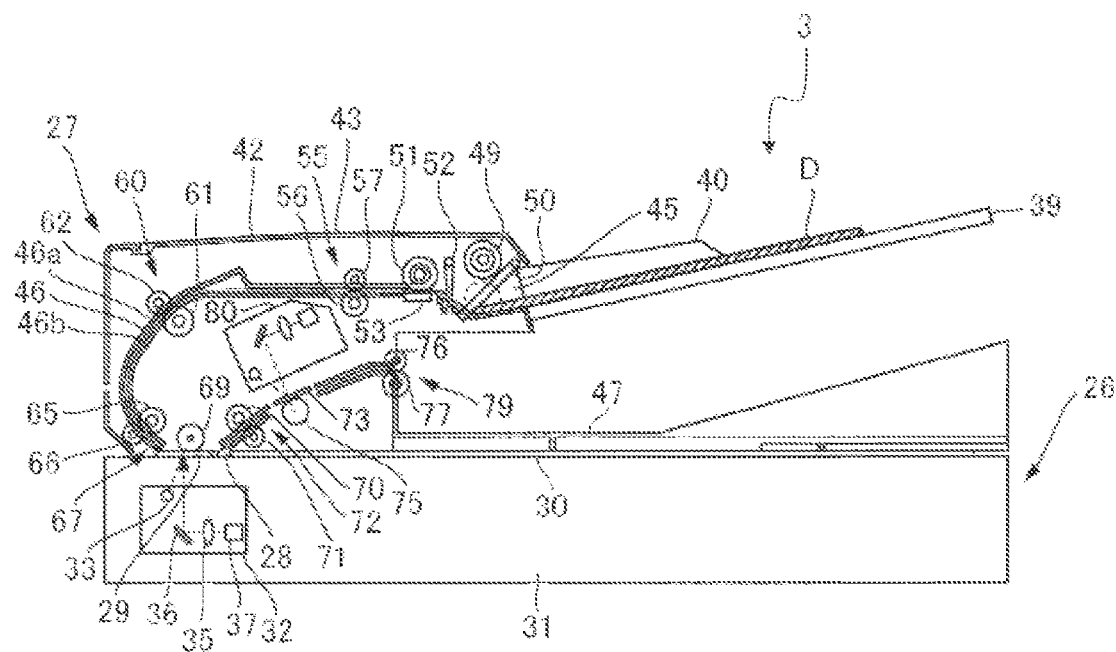
FIG. 2 is a side sectional view illustrating a structure of the image reading apparatus according to the embodiment of the present invention.
FIG. 3 is a perspective view illustrating a document placement detecting sensor lever according to the embodiment of the present invention.

As illustrated in FIG. 2, on an upper surface of the apparatus main body 26, a first platen glass 29 and a document glass plate 30 are provided. A jump ramp 28 configured to scoop up a document D (sheet P having an image formed thereon) conveyed to the first platen glass 29 is provided between the first platen glass 29 and the document glass plate 30. Below the document glass plate 30, an image reading portion (hereinafter referred to as "reader portion") 31 configured to read an image is provided. The reader portion 31 is provided with an optical table 32. The optical table 32 includes a lamp 33, a mirror 36, and a charge coupled device (hereinafter referred to as "CCD") 37. The lamp 33 radiates light onto an image surface of the document D. The mirror 36 guides light from the lamp 33 reflected from the document D.

The optical table 32 is coupled to an optical-table moving motor (not shown) through a wire (not shown). The optical table 32 is provided so as to move in a reciprocating manner in parallel to the document glass plate 30 by the rotation of the optical-table moving motor. The optical-table moving motor is a stepping motor of which rotation amount is determined by an input pulse number. The optical-table moving motor is configured to rotate in a forward direction and a reverse direction based on a position of a position sensor (not shown) configured to detect a home position of the optical table 32 as a reference so as to move the optical table 32 in a reciprocating manner.

The reader portion 31 has a sheet-through mode (document reading mode with ADF) and a flat-bed mode (document reading mode with document glass plate) to be selected by a user. The reader portion 31 is configured to read an image in any one of the modes based on the selection of the user. In this case, the sheet-through mode is a mode in which the document D fed from the ADF 27 is made to pass over the first platen glass 29 (image reading position) provided above the optical table 32 in a stopped state to read the image on the document. The flat-bed mode is a mode in which the document D placed on the document glass plate 30 by the user is optically scanned to read the image on the document D by moving the optical table 32 in a reciprocating manner.

The ADF 27 is provided above the apparatus main body 26. A rear portion of the ADF 27 is mounted to the reader portion 31 by a hinge (not shown) so as to be openable and closable. The ADF 27 is provided with a document tray 39 corresponding to a supporting portion on which the document D is to be supported. On both ends of the document tray 39, a right regulation plate (first regulation member) 40 and a left regulation plate (second regulation member) 41 are provided (see FIG. 6). The right regulation plate 40 regulates one side edge of the document D in a width direction orthogonal to the sheet feed direction (hereinafter referred to simply as "width direction"). The left regulation plate 41 regulates the other side edge in the width direction. The right regulation plate 40 and the left regulation plate 41 are provided so as to be opposed to each other in the width direction and movable in the width direction (direction indicated by the arrow E in FIG. 6). The right regulation plate 40 and the left regulation plate 41 are provided to move in association with the respective movements so that a midpoint (center) between the right regulation plate 40 and the left regulation plate 41 in the width direction is aligned with a center of conveyance of a sheet conveying path 46 (center of the sheet conveying path 46 in the width direction). In this case, the center of conveyance of the sheet conveying path 46 is a reference line which serves as a reference configured to convey the document (sheet) D. The center of conveyance is set, for example, to a center of the sheet conveying path 46 in the width direction (center of a sheet having a specified maximum width which can be conveyed by the ADF 27 in the width direction). The right regulation plate 40 and the left regulation plate 41 regulate the width direction of the document D placed on the document tray 39 so that the document D can be fed with the position in the width direction being aligned.

Moreover, as illustrated in FIG. 3, the document tray 39 is provided with a document placement detecting sensor 38 configured to detect the presence/absence of the document D placed on the document tray 39 together with a document placement detecting sensor lever 50 described later. The document placement detecting sensor 38 is configured by a transmissive photointerrupter including a light-emitting portion 38*a* and a light-receiving portion 38*b*.

A downstream side of the document tray 39 in the sheet feed direction is mounted to a main body portion 43 of the ADF 27 covered with a cover body 42. At a position of the main body portion 43, at which the document tray 39 is mounted, a feed port 45 through which the document D on the document tray 39 is fed into the main body portion 43 is provided. Moreover, the sheet conveying path 46 configured to convey the document D fed from the feed port 45 is provided inside the main body portion 43. The sheet conveying path 46 is formed by guide plates 46*a* and 46*b* provided so as to be opposed to each other. The sheet conveying path 46 is provided so as to be curved into an approximately U-like shape as viewed from the side. The sheet conveying path 46 is in communication with a discharge tray 47 onto which the document D of which an image has been read is discharged.

As illustrated in FIG. 2, the document placement detecting sensor lever 50 is provided above the downstream side of the document tray 39 in the sheet feed direction inside the main body portion 43. The document placement detecting sensor lever 50 is provided so as to detect the presence/absence of the document D placed on the document tray 39. The document placement detecting sensor lever 50 is pushed to be rotated by the document placed on the document tray 39. As illustrated in FIG. 3, the document placement detecting sensor lever 50 includes a first lever (left sensor lever 50*a*) corresponding to a first rotating portion, a second lever (right sensor lever 50*b*) corresponding to a second rotating portion, and a shaft member 50*c*. The shaft member 50*c* is provided above the document tray 39 so as to be pivotable in a direction orthogonal to the sheet conveying direction. On both ends of the shaft member 50*c*, the left sensor lever 50*a* and the right sensor lever 50*b* are provided so as to extend downward therefrom.

The left sensor lever 50*a* and the right sensor lever 50*b* are provided inside the main body portion 43 so as to be opposed in the direction orthogonal to the sheet conveying direction. The left sensor lever 50*a* is provided at a position at which the left sensor lever 50*a* can come into contact with the documents D in all sizes placed on the document tray 39 in center reference conveyance. Specifically, the left sensor lever 50*a* is provided so that a position of the left sensor lever 50*a* in the width direction is located between the right regulation plate 40 and the left regulation plate 41 when the document D having a feedable specified minimum width supported by the ADF 27 is regulated. The term "center reference conveyance" means feed and conveyance with the center of the sheet conveying path 46 in the width direction and the center of the documents D in the width direction being aligned with each other.

The left sensor lever 50 is located at a position at which the left sensor lever 50*a* can come into contact with all the documents when a width-direction size of a document D having a larger size of the documents D placed on the document tray 39 in a mix size document feeding mode is smaller than a predetermined width (for example, size equal to or smaller than B5R (182 mm)). The term "mix size document feeding mode" herein means the placement of the documents D having different document widths (sheet widths) in the width direction on the document tray 39 to read the documents D placed in a mixed manner while the documents D are passing over the image reading position.

On the other hand, the right sensor lever 50*b* is provided at a position at which the right sensor lever 50*b* can come into contact with all the documents when a document width in the width direction of the document D having a larger size in the documents placed in the mix size document feeding mode has a larger size than a predetermined width (for example, size equal to or larger than B4R (210 mm)). When the width direction of the document D having the specified maximum width supported by the ADF 27 is regulated by the right regulation plate 40 and the left regulation plate 41, the right sensor lever 50*b* is placed so as to overlap with all the sheets having the different widths and placed in a mixed manner on the document tray 39 in the feed direction within the document width of the document D having the specified minimum width from the right regulation plate 40 to the left regulation plate 41.

In other words, in the case of the mix size document feeding mode, the documents D having different widths are placed with their edges being aligned by the right regulation plate 40. In the case where the left sensor lever 50*a* cannot come into contact with any of the documents placed on the document tray 39 based on a difference between the sheet widths when the documents are placed in the mix size document feeding mode, the right sensor lever 50*b* is provided at a position at which the right sensor lever 50*b* can come into contact with all the documents placed on the document tray 39. In the case where the sheets having different widths are placed with each one edge being aligned by the right regulation plate 40 and the other edge of the sheet having a smaller width of the sheets placed on the document tray 39 is located on the side of the right regulation plate 40 with respect to the left sensor lever 50*a*, the right sensor lever 50*b* is provided so as to be located between the other edge of the placed sheet having the smaller width and the right regulation plate 40. The right sensor lever 50*b* is located so that a position of the right sensor lever 50*b* in the width direction is located out of a region between the right regulation plate 40 and the left regulation plate 41 when both edges of the document D having a feedable specified minimum width supported by the ADF 27 are regulated.

The right sensor lever 50b is provided so that a distal end of the right sensor lever 50b is located between the light-emitting portion 38a and the light-receiving portion 38b of the document placement detecting sensor 38, as illustrated in FIG. 3 to block the light emitted from the light-emitting portion 38a from the light-receiving portion 38b of the document placement detecting sensor 38.

Further, the left sensor lever 50a and the right sensor lever 50b are integrally formed through the shaft member 50c therebetween. A signal in accordance with rotations of the left sensor lever 50a and the right sensor lever 50b, that is, the rotation of the document placement detecting sensor lever 50 is output from the document placement detecting sensor 38. The signal from the document placement detecting sensor 38 is transmitted to a control portion 59. Whether a document is present or absent on the document tray 39 is determined by the control portion 59 based on the signal.

The document placement detecting sensor lever 50, the document placement detecting sensor 38, and the control portion 59 constitute a sheet detecting portion configured to detect the sheet on the document tray 39.

As illustrated in FIG. 2, a document supplying roller 49 configured to feed the document D placed on the document tray 39 to the sheet conveying path 46 is provided on a downstream side of the document placement detecting sensor lever 50 in the sheet conveying direction (hereinafter referred to simply as "downstream side"). The document supplying roller 49 is provided between the left sensor lever 50a and the right sensor lever 50b. The document supplying roller 49 is supported so as to be lifted up and down by holding arms 49a provided on both sides of the document supplying roller 49 in the width direction (see FIGS. 4A and 4B). A downstream-side end of each of the holding arms 49a in the conveying direction is supported pivotably by a main body of the ADF 27. A distal end of each of the holding arms 49a rotatably holds the document supplying roller 49. The document supplying roller 49 generally retracts above (position indicated by a solid line in FIG. 2) so as to avoid the contact with the document D and is lowered to a position indicated by a broken line so as to come into contact with an upper surface of the document D at the time of feed.

Figure 6:
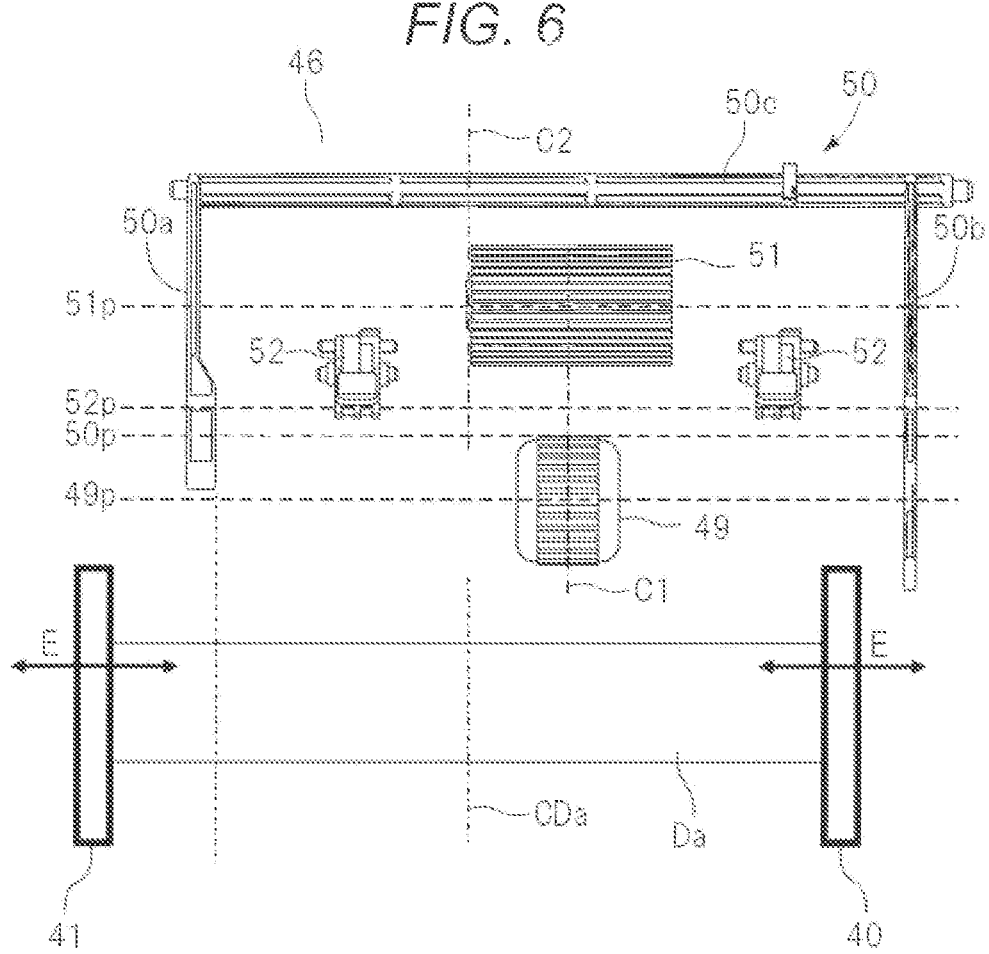
FIG. 6 is a diagram illustrating the arrangement of the various types of rollers and the document placement detecting sensor lever when a document having a feedable specified minimum width is placed on the document tray of the automatic document feeder according to the embodiment of the present invention based on a center reference.

The document supplying roller 49 is provided so that a center axis thereof in the width direction is located on a straight line C1 (see FIG. 6). The straight line C1 is located closer to the right regulation plate 40 with respect to a straight line C2 on which the center of the sheet conveying path 46 in the width direction is located. Specifically, the document supplying roller 49 is located in a shifted manner so that the center axis thereof is located on the side of the right regulation plate 40 with respect to the center of conveyance of the sheet conveying path 46 in the width direction. The straight line C1 is located so as to be approximately aligned with the center of the smaller-size document D in the width direction when the documents D in different sizes are placed on the document tray 39 in the mix size document feeding mode (see FIG. 8).

Figure 4A:
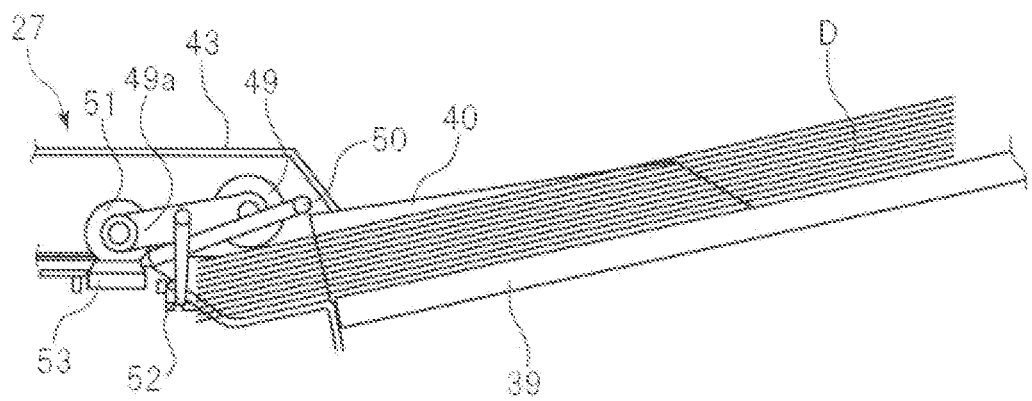
FIG. 4A is a diagram illustrating a state in which a sheaf of documents is placed on a document tray of an automatic document feeder according to the embodiment of the present invention.
Figure 4B:
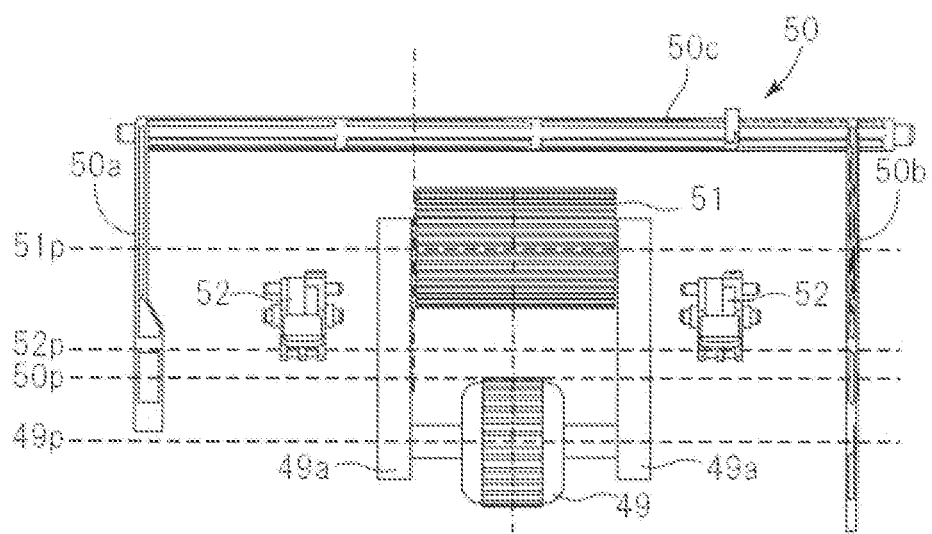
FIG. 4B is a diagram illustrating the arrangement of various types of rollers and the document placement detecting sensor lever.
Figure 5:
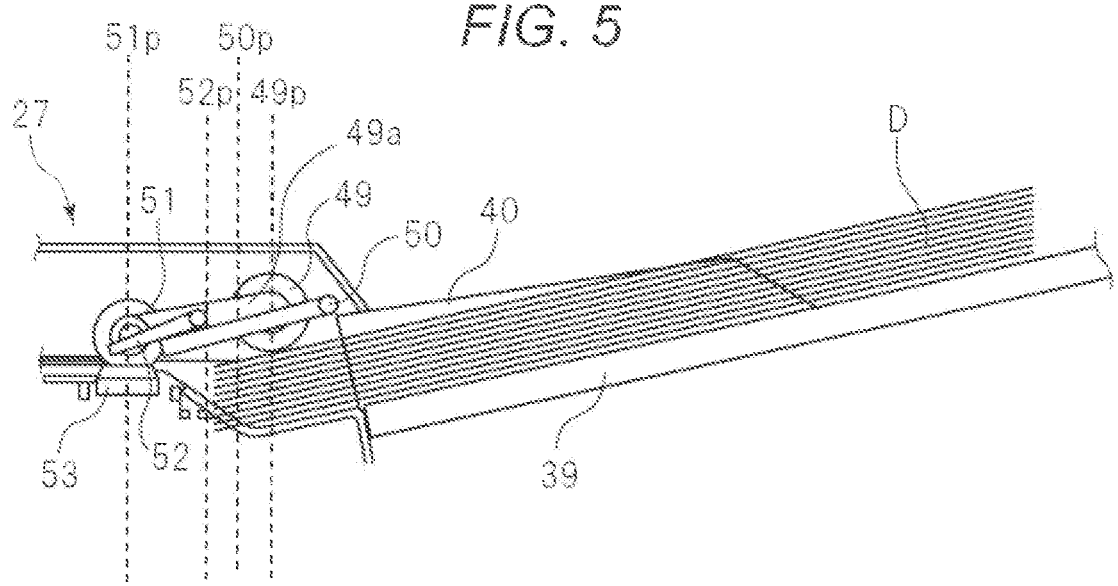
FIG. 5 is a diagram illustrating a state in which the feed of the sheaf of documents placed on the document tray of the automatic document feeder according to the embodiment of the present invention is started.

On a downstream side of the document supplying roller 49, as illustrated in FIGS. 4A and 4B, shutters 52 configured to block the placed document D are pivotably provided so as to prevent the document D from being pushed beyond a predetermined position 52p illustrated in FIG. 5 when the document D is placed on the document tray 39.

Further, a separation and conveying roller 51 configured to separate the documents D into each document and conveying the documents D one by one is provided downstream of the shutters 52. Similarly to the document supplying roller 49, the separation and conveying roller 51 is provided closer to the right regulation plate 40 with respect to the straight line C2 so that a center axis thereof in the width direction is located on the straight line C1 (see FIG. 6). The center axis of each of the document supplying roller 49 and the separation and conveying roller 51 in the width direction is located on the same straight line C1 extending in the sheet feed direction. Specifically, the separation and conveying roller 51 and the document supplying roller 49 are offset toward the right regulation plate 40 to be located at the same position with respect to the center of the sheet conveying path 46 in the orthogonal direction. The separation and conveying roller 51 and the document supplying roller 49 constitute a separation and feed portion of the ADF 27.

As a result of the offset of the document supplying roller 49 and the separation and conveying roller 51, a space from the center of the sheet conveying path 46 in the orthogonal direction to the right regulation plate 40 is eliminated. On the opposite side, however, a space from the center of the sheet conveying path 46 in the orthogonal direction to the left regulation plate 41 is enlarged. In the space from the center of the sheet conveying path 46 in the width direction to the left regulation plate 41, the left sensor lever 50a is provided. Therefore, the document placement detecting sensor lever 50 can be easily provided. In the embodiment, the left sensor lever 50a and the right sensor lever 50b are provided so as to extend downward from the shaft member 50c. On both sides of the document supplying roller 49, the holding arms 49a configured to hold the document supplying roller 49, which are supported pivotably on the downstream side in the conveying direction, are provided on the upstream side in the conveying direction. Therefore, for the arrangement of the left sensor lever 50a and the right sensor lever 50b in the width direction, it is difficult to provide the left sensor lever 50a and the right sensor lever 50b between the two holding arms 49a. Therefore, in the embodiment, the left sensor lever 50a and the right sensor lever 50b are provided on both sides of the two holding arms 49a so as to avoid a supplying portion configured to supply the documents. The supplying portion includes the holding arms 49a and the document supplying roller 49.

A separation pad 53 is provided so as to be opposed to the separation and conveying roller 51 (see FIG. 2). The separation pad 53 is in pressure contact with the separation and conveying roller 51, and is formed by using a friction member such as a rubber having a slightly smaller friction than that of the separation and conveying roller 51. The separation pad 53 and the separation and conveying roller 51 form a nip for separating and conveying the document D.

On a downstream side of the separation and conveying roller 51, a pull-out roller pair 55 configured to convey the document D, which includes a pull-out roller and a driven pull-out roller 57, is provided. On a downstream side of the pull-out roller pair 55, a registration roller pair 60 configured to correct a skew feed of the document D, which includes a registration roller 61 and a registration driven roller 62, is provided.

Further, toward the downstream of the registration roller pair 60, a first read roller pair 67 and an upstream platen roller 69 are provided. The first read roller pair 67 includes a first read roller 65 and a first driven read roller 66. The upstream platen roller 69 is provided on the first platen glass 29 so as to be opposed thereto. On a downstream side of the upstream platen roller 69, a second read roller pair 72 and a downstream platen roller 75 are provided. The second read roller pair 72 includes a second read roller 70 and a second driven read roller 71. The downstream platen roller 75 is provided below a second platen glass 73 so as to be opposed thereto. Further, on a downstream side of the downstream platen roller 75, a discharge roller pair 79 including a discharge roller 76 and a driven discharge roller 77 is provided. As illustrated in FIG. 2, a backside reading unit 80 configured to read a backside of the document D whose image on a front side has been read is provided above the second platen glass 73.

Next, an operation of reading the image by the image reading apparatus 3 configured as described above will be described referring to FIGS. 3 to 8. The document D of which an image is to be read is placed on the document tray 39. For the placement of the document, for example, as shown in FIG. 6, a document Da having a specified minimum width is placed on the document tray 39 with the center of the document being aligned with the center of the document tray 39 (hereinafter referred to as "based on the center reference"). Then, when a downstream-side edge of the placed document Da passes below the document supplying roller 49 in a retracting state located on a broken line 49p of FIGS. 5 and 6 to reach a detection position 50p of the document placement detecting sensor lever 50, the downstream-side edge of the document Da comes into abutment against the left sensor lever 50a. After the document Da comes into abutment against the left sensor lever 50a, the left sensor lever 50a is thrust away by the downstream-side edge of the document Da so as to pivot in a direction indicated by the arrow A of FIG. 3. Then, after the document Da thrusts away the left sensor lever 50a, as illustrated in FIG. 4A, the downstream-side edge of the document Da comes into abutment against the shutters 52, and thus the document Da is placed on the document tray 39.

With the pivot of the left sensor lever 50a, the shaft member 50c rotates in a direction indicated by the arrow C of FIG. 3. With the rotation of the shaft member 50c, the right sensor lever 50b provided so as to extend from the shaft member 50c also pivots in a direction indicated by the arrow B of FIG. 3. When the right sensor lever 50b pivots, the light blocked by the right sensor lever 50b from the light-receiving portion 38b of the document placement detecting sensor 38 is cancelled. As a result, the light-receiving portion 38b now receives the light from the light-emitting portion 38a. By the light reception by the light-receiving portion 38b, a signal indicating the placement of the document D on the document tray 39 is output from the document placement detecting sensor 38.

Figure 7:
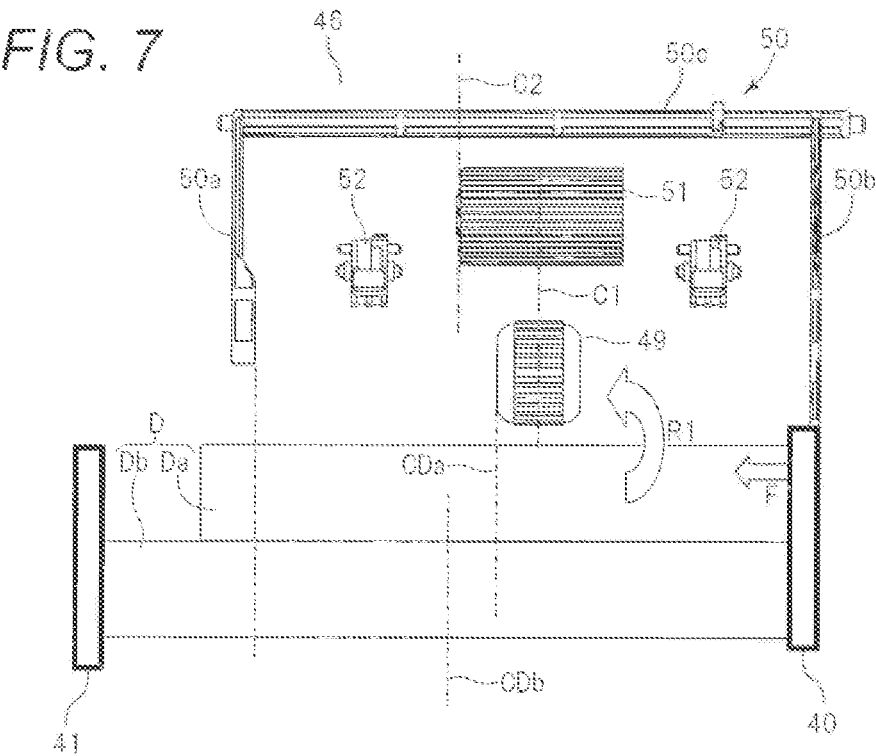
FIG. 7 is a diagram illustrating the arrangement of the various types of rollers and the document placement detecting sensor lever when documents having different sheet widths are placed in a mixed manner on the document tray of the automatic document feeder according to the embodiment of the present invention.

For example, as illustrated in FIG. 7, when the documents are to be read in the mix size document feeding mode, documents Da and Db having different sizes are placed on the document tray 39 under a state in which each one edge in the width direction thereof is abutted against and aligned by the right regulation plate 40. When a document width in the width direction of the document Db having the larger size of the documents D placed in a mixed manner is smaller than a predetermined width (for example, equal to or smaller than B5R (182 mm)), the downstream-side edges of the documents Da and Db come into abutment against the left sensor lever 50a as in the case of the placement of the documents based on the center reference. As described above, as a result of the abutment of the documents Da and Db against the left sensor lever 50a, the documents Da and Db placed on the document tray 39 are detected in the same manner as that in the above-mentioned case where the document Da is placed based on the center reference.

Figure 8:
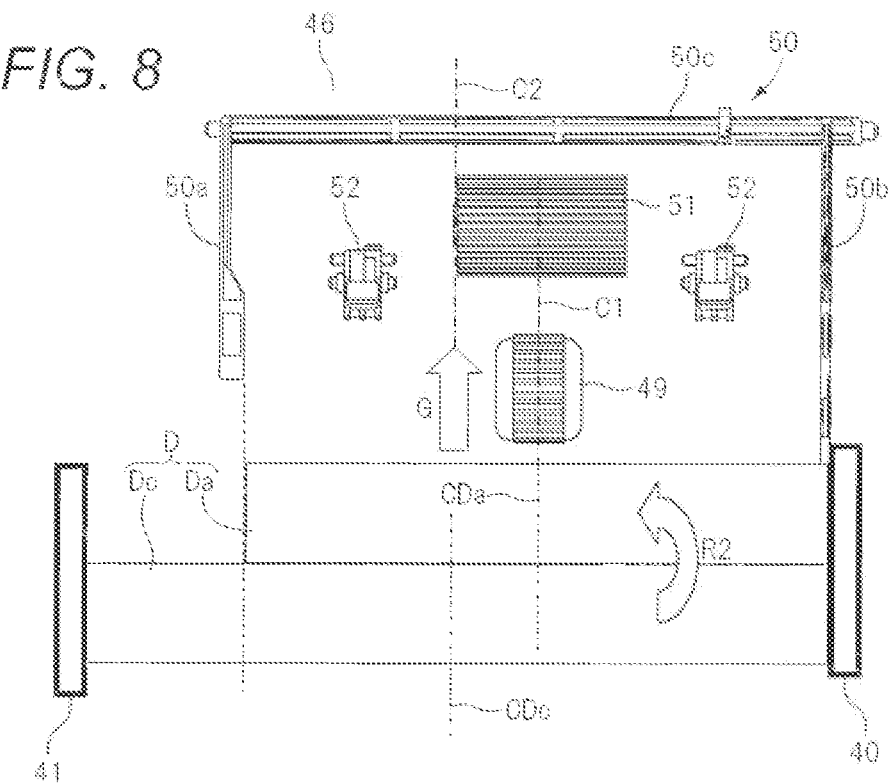
FIG. 8 is a diagram illustrating the arrangement of the various types of rollers and the document placement detecting sensor lever when documents having different sizes from those of the documents illustrated in FIG. 7 are placed in a mixed manner on the document tray of the automatic document feeder according to the embodiment of the present invention.

Moreover, for example, FIG. 8 illustrates a state where the document Da and a document Dc are placed on the document tray 39 in a mixed manner under a state in which each one edge thereof is abutted against the right regulation plate 40. In this case, the document Dc is a document having a larger size in the width direction than that of the document Db and a specified maximum width supported by the ADF 27. When the width direction of the document Dc is regulated, the right regulation plate 40 and the left regulation plate 41 are located outwardly away from the positions at which the width direction of the document Db is regulated. Therefore, as compared with the position at which the document Da is placed together with the document Db (see FIG. 7), the document Da which is located with one edge being abutted against the right regulation plate 40 is placed so as to be offset in a direction of movement of the right regulation plate 40 by the amount of movement thereof. As a result, the downstream-side edge of the document Da does not come into abutment against the left sensor lever 50a. However, the downstream-side edge of the document Da is held in abutment against the right sensor lever 50b. On the other hand, the downstream-side edge of the document Dc is held in abutment against both the left sensor lever 50a and the right sensor lever 50b. Specifically, for the document Da which cannot be detected by the left sensor lever 50a in the above-mentioned position, the right sensor lever 50b detects the documents Da and Dc based on a difference in the document width between the document Da and the document Dc placed on the document tray 39. In this manner, the document Da is held in abutment against the right sensor lever 50b, whereas the document Dc is held in abutment against both the left sensor lever 50a and the right sensor lever 50b. As a result, the documents Da and Dc on the document tray are detected in the same manner as in the above-mentioned case where the document Da is placed based on the center reference.

When the placement of the document on the document tray 39 is detected by the document placement detecting sensor 38, the feed of the documents D is started. With the start of the feed of the documents D, the document supplying roller 49 is lowered to come into abutment against an upper surface of a sheaf of the documents D, as illustrated in FIG. 5. Then, the shutters 52 pivot to cancel the blocking of the documents D. The documents D are fed by the rotation of the document supplying roller 49 in a direction indicated by the arrow G of FIG. 8 from the position 52 at which the documents D are blocked by the shutters 52 toward the nip position 51p formed by the separation and conveying roller 51 and the separation pad 53.

When a plurality of the documents D are fed together in an overlapping state (double feed state) to the nip position 51p, the documents D are separated into each document by the separation and conveying roller 51 and the separation pad 53. Each of the thus separated documents D is conveyed to the pull-out roller pair 55 by the separation and conveying roller 51.

When a position of a center CDa of the document Da in the width direction is aligned with the position of the center axes of the document supplying roller 49 and the separation and conveying roller 51 in the width direction as illustrated in FIG. 8, a moment of rotation for skew-feeding the document Da at the time of feed and separation of the document Da is not generated. As a result, the document Da can be fed, separated, and conveyed without skew feed of the document Da.

Moreover, as illustrated in FIG. 7, when the center CDa of the document Da in the width direction is located on the side of the left regulation plate 41 with respect to the straight line C1 corresponding to a position of the center axes of the document supplying roller 49 etc. in the width direction, a moment of rotation in a counterclockwise direction (indicated by the arrow R1 of FIG. 7) is generated at the time of feed and separation. However, one edge of the document Da in the width direction is regulated by the right regulation plate 40. Therefore, the rotation of the document Da caused by the moment of rotation is regulated by the right regulation plate 40, and hence the document Da is fed and separated without skew feed.

The position of the center axis of each of the document supplying roller 49 and the separation and conveying roller 51 in the width direction is offset toward the right regulation plate 40 with respect to the center CDa of the document Da in the width direction, and the centers CDb and CDc in the width direction of the respective documents Db and Dc having larger sizes, which are placed based on the center reference, illustrated in FIG. 6. Thus, a moment of rotation for rotating the documents Da, Db, and Dc in the counterclockwise direction (indicated by the arrow R2 of FIG. 8) is generated in the documents Da, Db, and Dc at the time of feed and separation. However, both the edges of each of the documents D are respectively regulated by the right regulation plate 40 and the left regulation plate 41, and hence the skew feed is suppressed.

Then, the documents D separated into each document are conveyed to the registration roller pair 60 by the pull-out roller 56. When the separated document D is conveyed in a skew feed state, the document D is nipped and abutted against the registration roller pair 60 to correct the skew feed. Then, after the skew feed is corrected, the document D is conveyed to the first read roller pair 67 by the registration roller 61. The document D conveyed to the first read roller pair 67 is nipped between the first read roller 65 and the first driven read roller 66 and caused to pass through a clearance between the first platen glass 29 and the upstream platen roller 69 by the first read roller 69 to be conveyed to the second read roller pair 72.

When the document D passes over the first platen glass 29, a document surface of the document D reflects light from the lamp 33 provided to the optical table 32. After being guided to the lens 35 by the mirror 36, the reflected light is focused on the CCD 37 by the lens 35. The CCD 37 photoelectrically converts the reflected light which reflects document information into an electronic image signal.

The document D conveyed to the second read roller pair 72 is conveyed to the discharge roller pair 79 while passing through a clearance between the second platen glass 73 and the downstream platen roller 75 by the second read roller 70. After a surface of the document D, opposite to the document surface which has been read while passing over the first platen glass 29, is read by the backside reading unit 80 while passing over the second platen glass 73, the document D is discharged to the discharge tray 47 by the discharge roller pair 79.

The image information of the thus read document D is accumulated in a memory as data, and is then output to the image forming portion 5. Then, the image forming portion 5 forms an image on the sheet P fed from the sheet feed cassette 23 based on the image signal.

Then, after the last document D placed on the document tray 39 is fed, the right sensor lever 50b and the left sensor lever 50a, which have been thrust away by the documents D so as to pivot, now pivot so as to return to the original positions. With the pivot of the right sensor lever 50b, in the light-receiving portion 38b of the document placement detecting sensor 38, light from the light-emitting portion 38a is again blocked by the right sensor lever 50b. The control portion 59 detects the absence of the document D on the document tray 39 based on a signal from the document placement detecting sensor 38. Specifically, the control portion 59 determines that all the documents D have been fed. With the determination, the feed of the document D by the ADF 27 is stopped.

As described above, the document D is placed on the document tray 39 so as to be held in abutment against the left sensor lever 50a, and thus the presence/absence of the document D on the document tray 39 is detected. At the same time, in the case where the document Da placed on the document tray 39 cannot be detected by the left sensor lever 50a when the document is read in the sheet-through in the mix size document feeding mode, the downstream-side edge of the document Da is brought into abutment against the right sensor lever 50b. In this manner, all the sheets including the document Da are detected. As a result, even when the documents D having different document widths are placed on the document tray 39 in a mixed manner, all the documents D can be reliably detected. As a result, the accuracy of detection of the sheets placed on the document tray 39 can be improved. Therefore, for example, the feed of the documents D can be prevented from being terminated even though the documents D are still present on the document tray 39.

Moreover, when the width direction of the document Dc having the specified maximum width is regulated by the right regulation plate 40 and the left regulation plate 41, the right sensor lever 50b is provided so as to be located within the document width in the width direction of the document Da having the specified minimum width from the right regulation plate 40 toward the left regulation plate 41. As a result, in the case where the documents including the document Dc having the specified maximum width are read in the sheet-through in the mix size document feeding mode, even when the left sensor lever 50a cannot detect the placed document Da having the smaller width, all the placed documents D including the document Da can be detected by the right sensor lever 50b. As a result, all the documents D placed on the document tray 39 can be reliably detected.

The document placement detecting lever 50 is configured to include the right sensor lever 50b, the left sensor lever 50a, and the shaft member 50c, whereas the left sensor lever 50a and the right sensor lever 50b are provided so as to extend downward from both ends, that is, from the left and right ends of the shaft member 50c. As a result, the left sensor lever 50a and the right sensor lever 50b are provided without disturbing the document supplying roller 49, the separation and conveying roller 51, and the shutters 52. Therefore, the presence/absence of the documents D on the document tray 39 can be detected in a simple configuration. Moreover, as compared with the case where the sensor levers are provided to extend upward and therefore the document D having a curled downstream-side edge is likely to slip upward, the documents D can be reliably detected by the left sensor lever 50a and the right sensor lever 50b.

Moreover, the left sensor lever 50a and the right sensor lever 50b are formed integrally through the shaft member 50c. As a result, the left sensor lever 50a and the right sensor lever 50b interlock. Therefore, the document D can be detected by the left sensor lever 50a even when the document placement detecting sensor 38 is provided only to the right sensor lever 50b. As a result, only one document placement detecting sensor 38 is sufficient, and hence manufacturing cost can be reduced.

As already described above, when the position of the center axis of each of the document supplying roller 49 and the separation and conveying roller 51 in the width direction is closer to the right regulation plate 40 with respect to the position of the center of the document D having a smaller width in the width direction, the document D is conveyed with the tendency to rotate in the counterclockwise direction at the time of feed and separation. When the center axis of each of the document supplying roller 49 and the separation and conveying roller 51 in the width direction is located too close to the right regulation plate 40, some documents D are bent under a regulating force (indicated by the arrow F of FIG. 7) from the right regulation plate 40 depending on a stiffness (rigidity) of the document D. Thus, it becomes difficult to regulate the documents D by the right regulation plate 40. As a result, the document D is conveyed with skew feed in a state in which the document D is greatly rotated.

Therefore, when the documents are to be read in the sheet-through in the mix size document feeding mode, it is suitable to approximately align the position of the center axis of each of the document supplying roller 49 and the separation and conveying roller 51 with the center of the document D having a smaller width in the width direction. For example, the larger size document D in A3 size (297 mm in width) and the smaller size document D in B4 size (257 mm in width) are placed on the document tray 39 so as to be read in the sheet-through in the mix size document feeding mode. At this time, based on the expression: (297−257)/2=20, the center axis of each of the document supplying roller 49 and the separation and conveying roller 51 may be shifted by 20 mm from the position of the center of the larger size document D in the width direction toward the position of the center of the smaller size document D in the width direction.

Similarly, the larger size document D in B4 size (257 mm in width) and the smaller size document D in A4 size (210 mm in width) are placed on the document tray 39 so as to be read in the mix size document feeding mode. At this time, based on the expression: (257−210)/2=23.5, the center axis of each of the document supplying roller 49 and the separation and conveying roller 51 may be shifted by 23.5 mm from the position of the center of the larger size document D in the width direction toward the position of the center of the smaller size document D in the width direction.

Although the single document placement detecting sensor 38, the left sensor lever 50*a*, and the right sensor lever 50*b* are configured to detect the documents D in the embodiment, the configuration is not limited thereto. Any configuration may be used as long as all the documents D placed on the document tray 39 can be detected by providing at least two sensors in the width direction. In this case, the sensors are configured so that document placement detection functions in an ON state as long as any one of the sensor is ON even when the other sensor(s) is OFF.

Figure 9:
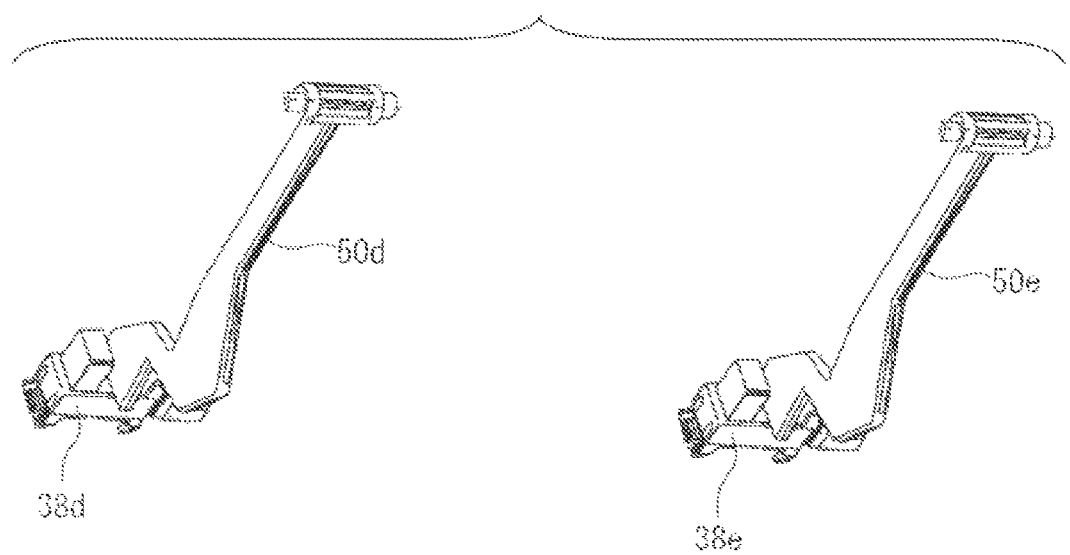
FIG. 9 is a diagram illustrating a variation of sensor levers and a sensor portion.

Moreover, there has been exemplified a mode in which the first rotating portion and the second rotating portion rotated by being pushed by the documents are the sensor levers 50*a* and 50*b* extending from the shaft member 50*c* and a sensor portion is configured to include the single sensor (document placement detecting sensor 38) configured to generate the signal in accordance with the displacements of the sensor levers 50*a* and 50*b*. As illustrated in FIG. 9, however, the sensor portion may be configured to include two levers 50*d* and 50*e* and two sensors 38*d* and 38*e*. The levers 50*d* and 50*e* are the first rotating portion and the second rotating portion, respectively, supported so as to be rotated independently of each other. The sensors 38*d* and 38*e* generate a signal in accordance with the respective displacements of the levers 50*d* and 50*e*. Although the photointerrupter has been exemplified as a sensor configured to generate a signal in accordance with the movement of the sensor levers as the rotating portions, a contact type sensor which comes into contact with the sensor levers may be used instead.

Further, there has been described the case where two types of documents D having different sheet widths are read in the sheet-through in the mix size document feeding mode in the embodiment. However, the present invention is not limited to the above-mentioned case. The present invention is also applicable even to the case where, for example, at least three types of documents D having different document widths are read in the sheet-through in the mix size document feeding mode. Moreover, although the copying machine has been used as the image forming apparatus in the embodiment, the image reading apparatus according to the embodiment may be used for an image forming apparatus such as a copying machine, a fax machine, and a scanner. Specifically, the image reading apparatus according to the embodiment may be applied to any apparatus as long as the apparatus conveys a document placed on a placement portion and reads an image of the conveyed document.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-124455, filed May 31, 2012, which is hereby incorporated by reference herein in its entirety.

What is claimed is:

1. An image reading apparatus comprising:
an image reading portion configured to read an image formed on a sheet;
a supporting portion on which a plurality of sheets, of which images are to be read by the image reading portion, are to be supported;
a separation and feed portion configured to separate the plurality of the sheets supported on the supporting portion into each sheet, and to feed the sheet to a sheet conveying path configured to guide the sheet to the image reading portion;
a first regulation member and a second regulation member provided on both sides of the plurality of sheets supported on the supporting portion in a width direction orthogonal to a feed direction of the plurality of sheets;
a rotating member to be rotated by being pushed by at least one sheet of the plurality of sheets supported on the supporting portion, the rotating member including a first portion to be contacted with the at least one sheet and a second portion to be contacted with the at least one sheet; and
a sensor portion configured to generate a signal in accordance with a rotation of the rotating member,
wherein the first portion is provided so that a position of the first portion in the width direction is located between the first regulation member and the second regulation member when both edges of a sheet having a feedable minimum width are supported on the supporting portion, and
the second portion is provided so that, when sheets having different widths are supported on the supporting portion with each having one edge being aligned with the first regulation member and another edge of a sheet having a smaller width than the sheets supported on the supporting portion is located on a side of the first regulation member with respect to the first portion, a position of the second portion in the width direction is located between the other edge of the sheet having the smaller width supported on the supporting portion and the first regulation member.

2. An image reading apparatus according to claim 1, wherein the second portion is provided so that the position of the second portion, in the width direction, is located within a sheet width of the sheet having the feedable minimum width from the first regulation member toward the second regulation member, when the first regulation member and the second regulation member, configured to regulate the width direction of the plurality of sheets supported on the supporting portion, regulate both edges of a sheet having a feedable maximum width in the width direction.

3. An image reading apparatus according to claim 1, wherein the rotating member includes a shaft member provided with the first portion and the second portion.

4. An image reading apparatus according to claim 1, wherein the first regulation member and the second regulation member are configured to move in association with each other so that a midpoint between the first regulation member and the second regulation member, in the width direction, is aligned with a center of the sheet conveying path, and
wherein the separation and feed portion is provided in a shifted manner so as to be located on the side of the first regulation member in the width direction with respect to the center of the sheet conveying path.

5. An image forming apparatus comprising:
an image reading apparatus as recited in claim 1; and
an image forming portion configured to form an image according to image information read by the image reading apparatus.

6. An image reading apparatus according to claim 1, wherein the separation and feed portion comprises:
a supplying roller configured to be lifted up and down to come into contact with an upper surface of at least one sheet of the plurality of sheets supported on the supporting portion; and
holding arms configured to hold the supplying roller so as to enable lifting of the supplying roller up and down,
wherein the second portion is provided on one side in the width direction with respect to the holding arms, and
wherein the first portion is provided on another side in the width direction with respect to the holding arms.

7. An image reading apparatus according to claim 1, wherein the first regulation member and the second regulation member are configured to move in association with each other so that a midpoint between the first regulation member and the second regulation member in the width direction is aligned with a center of the sheet conveying path.

8. An image reading apparatus comprising:
a supporting portion on which a sheet is to be supported;
a supplying portion configured to supply the sheet supported on the supporting portion;
an image reading portion configured to read an image of the sheet supplied by the supplying portion;
a first regulation member provided so as to be movable in a width direction orthogonal to a feed direction of the sheet, the first regulation member configured to regulate one side edge of the sheet supported on the supporting portion in the width direction;
a second regulation member provided so as to be opposed to the first regulation member in the width direction, the second regulation member configured (i) to move in association with the first regulation member so that a midpoint between the first regulation member and the second regulation member in the width direction is located at a predetermined position, and (ii) to regulate another side edge of the sheet supported on the supporting portion in the width direction; and
a sheet detecting portion configured to detect whether or not a sheet is present in a first position and a second position on the supporting portion,
wherein the first position is set to be located between the first regulation member and the second regulation member when both side edges of a sheet having a feedable minimum width are supported on the supporting portion, and in a position within a sheet width of the sheet having the feedable minimum width from the first regulation member located on a side of the predetermined position with respect to the second position.

9. An image reading apparatus according to claim 8, wherein the supplying portion comprises:
a supplying roller configured to be lifted up and down to come into contact with an upper surface of the sheet supported on the supporting portion; and
holding arms configured to hold the supplying roller so as to enable lifting of the supplying roller up and down.

10. An image reading apparatus according to claim 8, wherein the supplying portion is provided in a shifted manner so as to be located on a side of the first regulation member in the width direction with respect to the predetermined position.

11. An image reading apparatus according to claim 10, wherein the second position is set on one side in the width direction with respect to the supplying portion, and the first position is set on an other side in the width direction with respect to the supplying portion.

12. An image reading apparatus comprising:
an image reading portion configured to read an image formed on a sheet;
a supporting portion on which a plurality of sheets, of which images are to be read by the image reading portion, are to be supported;
a separation and feed portion configured to separate the plurality of the sheets supported on the supporting portion into each sheet, and to feed the sheet to a sheet conveying path configured to guide the sheet to the image reading portion;
a first regulation member and a second regulation member provided on both sides of the plurality of sheets supported on the supporting portion in a width direction orthogonal to a feed direction of the plurality of sheets, and configured to move in the width direction;
a first rotating portion to be rotated by being pushed by at least one sheet of the plurality of sheets supported on the supporting portion;
a second rotating portion to be rotated by being pushed by at least one sheet of the plurality of sheets supported on the supporting portion;
a first sensor portion configured to generate a signal in accordance with a rotation of the first rotating portion; and
a second sensor portion configured to generate a signal in accordance with a rotation of the second rotating portion,
wherein the first rotating portion is provided so that a position of the first rotating portion in the width direction is located between the first regulation member and the second regulation member when both edges of a sheet having a feedable minimum width are supported on the supporting portion, and
the second rotating portion is provided so that, when sheets having different widths are supported on the supporting portion, with each having one edge being aligned with the first regulation member and another edge of a sheet having a smaller width than the sheets supported on the supporting portion is located on a side of the first regulation member with respect to the first rotating portion, a position of the second rotating portion in the width direction is located between the other edge of the sheet having the smaller width supported on the supporting portion and the first regulation member.

13. An image reading apparatus according to claim 12, wherein the second rotating portion is provided so that the position of the second rotating portion in the width direction is located within a sheet width of the sheet having the feedable minimum width from the first regulation member toward the second regulation member, when the first regulation member and the second regulation member, configured to regulate the width direction of the sheets supported on the supporting portion, regulate both edges of a sheet having a feedable maximum width in the width direction.

14. An image reading apparatus according to claim 12, wherein the first regulation member and the second regulation member are configured to move in association with each other so that a midpoint between the first regulation member and the second regulation member in the width direction is aligned with a center of the sheet conveying path, and wherein the separation and feed portion is provided in a shifted manner so as to be located on the side of the first regulation member in the width direction with respect to the center of the sheet conveying path.

15. An image reading apparatus according to claim 12, wherein the separation and feed portion comprises:

a supplying roller configured to be lifted up and down to come into contact with an upper surface of at least one sheet of the plurality of sheets supported on the supporting portion; and holding arms configured to hold the supplying roller so as to enable lifting of the supplying roller up and down, wherein the second rotating portion is provided on one side in the width direction with respect to the holding arms, and wherein the first rotating portion is provided on another side in the width direction with respect to the holding arms.

16. An image reading apparatus according to claim 12, wherein the first regulation member and the second regulation member are configured to move in association with each other so that a midpoint between the first regulation member and the second regulation member in the width direction is aligned with a center of the sheet conveying path.

\* \* \* \* \*